United States Patent [19]

Beaufils et al.

[11] Patent Number: 5,159,212

[45] Date of Patent: Oct. 27, 1992

[54] PROTECTION DEVICE FOR A DIGITAL SIGNAL TRANSMISSION SYSTEM

[75] Inventors: Jean-Marie Beaufils, Paris; Joseph Sammut, Nozay, both of France

[73] Assignee: Alcatel CIT, Paris, France

[21] Appl. No.: 545,728

[22] Filed: Jun. 29, 1990

[30] Foreign Application Priority Data

Jun. 30, 1989 [FR] France ............................ 89 08825

[51] Int. Cl.$^5$ .................... H03K 17/007; H03K 17/16
[52] U.S. Cl. ............................. 307/442; 307/296.4; 307/443; 365/225.7
[58] Field of Search .................. 307/442, 443, 296.4; 365/189.01, 225.7, 226

[56] References Cited

U.S. PATENT DOCUMENTS

| | | | |
|---|---|---|---|
| 4,425,517 | 1/1984 | Smith | 307/442 |
| 4,481,430 | 11/1984 | Houk et al. | 307/442 |
| 4,896,055 | 1/1990 | Fujii et al. | 307/442 |
| 4,902,910 | 2/1990 | Hsieh | 307/296.4 |
| 4,935,645 | 6/1990 | Lee | 365/225.7 |

FOREIGN PATENT DOCUMENTS 3304105  8/1984  Fed. Rep. of Germany.

*Primary Examiner*—Edward P. Westin
*Assistant Examiner*—Andrew Sanders
*Attorney, Agent, or Firm*—Sughrue, Mion, Zinn, Macpeak & Seas

[57] ABSTRACT

The protection device for digital signal transmission systems includes, in at least one of the items of terminal equipment of the system, a logic circuit responsible for setting the output of this equipment to the high impedance state or to a determined potential should the power supply to the logic circuits constituting this equipment be cut off.

21 Claims, 1 Drawing Sheet

to a determined potential.

PROTECTION DEVICE FOR A DIGITAL SIGNAL TRANSMISSION SYSTEM

BACKGROUND OF THE INVENTION

The present invention relates to a device for protecting a digital signal transmission system in the case of failure affecting items of equipment that make up part of this system.

The invention particularly applies to a system for transmitting digital signals between an item of interrogating equipment and "n" items of responding terminal equipment in which at least the responses to such interrogations are carried over a transmission support that is common to the "n" items of responding terminal equipment.

Such a configuration is for example encountered where digital signals are transmitted between an interrogating item of terminal equipment and "n" responding items of terminal equipment that take the form of circuit boards grouped together in the same chassis or sub-assembly in order to constitute a complex functional assembly such as a digital signal multiplexing-demultiplexing unit, such transmission being typically employed for the purposes of centralizing, using an interrogating equipment board, alarm data relating to certain functional failures in the responding equipment boards.

Such equipment boards include logic circuits requiring to be powered by a source of direct current in order to operate, and a fuse is generally provided on each board, the fuse being designed to cut off the power supply when such boards are exposed to a risk of a deterioration as a result, for example, of excess voltage or excess current being present. The failure condition that was discussed above corresponds to this cutting off of the power supply.

Depending of the technology employed in the logic circuits used in such equipment, a problem can now occur. In effect, when such logic circuits are implemented in certain technologies, such as the HCMOS technology, which it is particularly useful to employ by virtue of the low power consumption of such circuits and their moderate cost, they can, in the absence of actual power to their terminals, continue to be powered by the digital signals that are applied thereto for processing, this latch-up type phenomenon being referred to by the name of "self-powering".

In a configuration such as the one described above that includes a common transmission support, this self-powering phenomenon can lead to serious disturbances which can even go as far as deterioration of the circuits. In effect, there is then the danger of having simultaneous responses on the common transmission support from several responding items of equipment, either of direct origin because of a failure involving certain ones of them or, indirectly as a result of a failure that involves the interrogating item of equipment which may then simultaneously interrogate several items of responding equipment.

SUMMARY OF THE INVENTION

The present invention sets out to provide a protection device enabling a solution to be found to this problem. In accordance with the invention, a protection device for a digital signal transmission system is essentially characterized in that it includes, in at least one of the items of terminal equipment of this system, a logic circuit providing, should the power supply to the logic circuits constituting this equipment be cut off, setting of the output of this equipment to the high impedance state or to a determined potential.

BRIEF DESCRIPTION OF THE DRAWINGS

Other objects and characteristics of the invention will become more clear from the following description of examples of embodiments read in conjunction with the attached drawings in which.

DETAILED DESCRIPTION OF THE INVENTION

Figure 1:
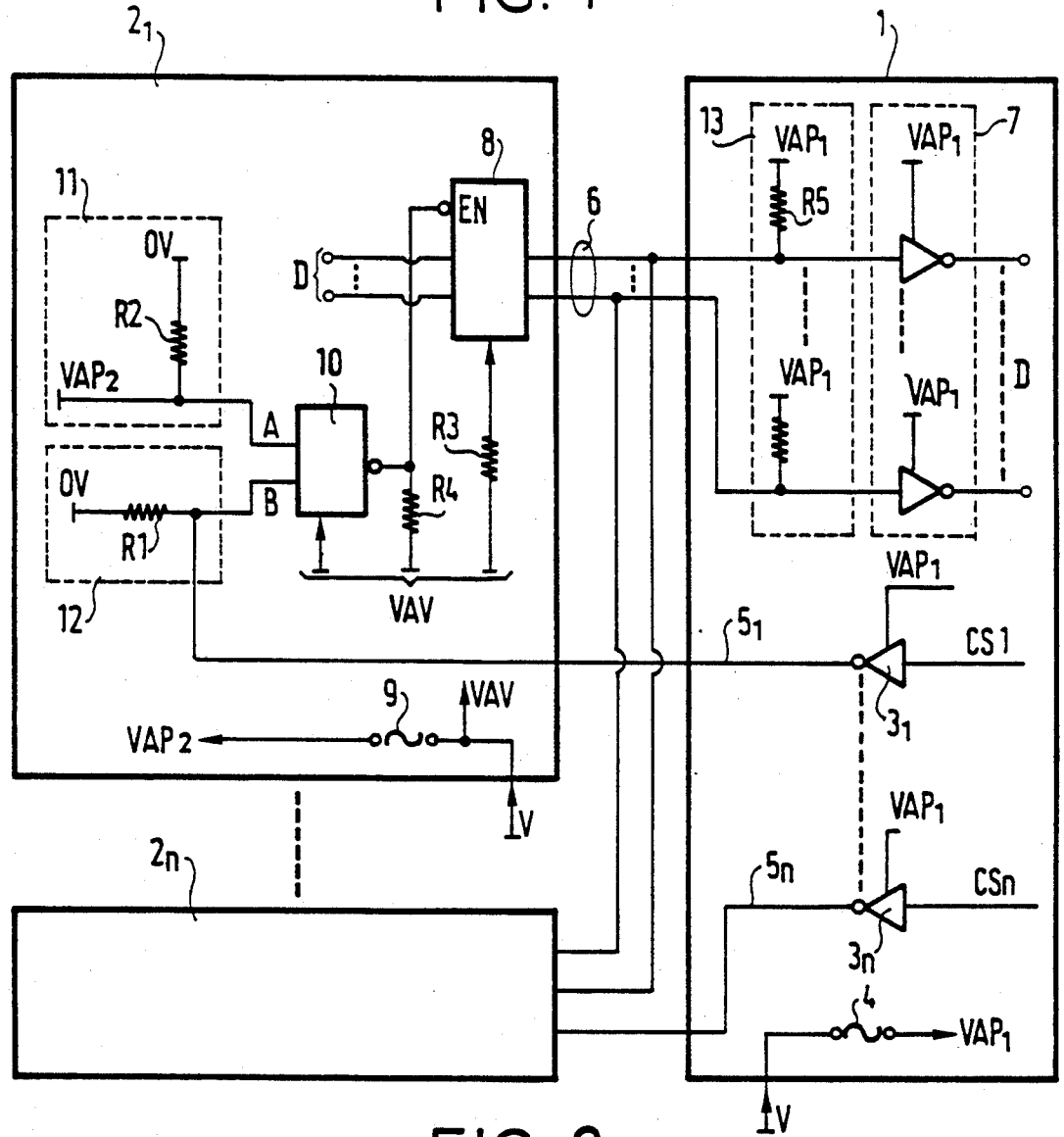
FIG. 1 is a circuit diagram of a protection device in accordance with the invention.

In FIG. 1, the protection device provided in the item of interrogating equipment 1 and in one of the responding items of equipment 21 is shown schematically, the elements of the protection devices provided in the other items of responding equipment 22 ... 2n being identical to those provided in this latter one; they have not been shown for the sake of improved clarity of the drawing.

The interrogation signals CS1 ... CSn which are produced in the interrogating equipment by a set of circuits which have not been shown as they do not constitute part of the invention, are respectively applied to n logic circuits 31 ... 3n implemented in a technology which is not subject to the self-powering phenomenon, such as for example TTL technology, and are powered by a reference voltage VAP1 obtained downstream of a fuse 4 provided on this item of equipment, the fuse being supplied at its upstream end with a direct current voltage V.

The interrogation signals obtained at the output of these logic circuits 31-3n are applied respectively to the responding items of equipment 21-2n via "n" leads 51-5n. Should the fuse 4 on the equipment board blow, with the result that these circuits are no longer powered, a determined voltage level that is characteristic of this condition is obtained at the output of these circuits.

Inversely, the answers or responses from the responding items of equipment 21-2n are directed to the interrogating equipment over a common transmission support which is here constituted by a "p"-line parallel bus 6 and are applied, at their input into this equipment, to a logic circuit 7 which can be implemented in a technology that is or which is not subject to the self-powering phenomenon (the problem here is in fact less acute than is the case for access to the common bus) and which is powered just like the logic circuit 31-3n, in other words powered only in the absence of cutting off of the power, by the voltage VAP1. The logic circuit 7 includes the same number of individual identical logic circuits as the number of lines on the bus, each of them being assigned to one of the bus lines.

The logic circuits 31 ... 3n and 7 having the characteristics discussed above could be directly formed by the terminal logic circuits of the set of circuits for producing the interrogation signals CS1–CSn or for processing the response data D from the responding items of equipment. These logic circuits 31 ... 3n and the individual logic circuits of circuit 7 are moreover, in the example considered, constituted by inverters.

The answer or response data D drawn up in the responding equipment 21 by a set of circuits which are not shown as they do not constitute part of the invention, are applied prior to their transmission over bus 6, to a logic circuit 8 provided with an input for controlling enabling or the setting of the output thereof to the high impedance state. This logic circuit 8 is implemented in a technology which may or may not be subject to the self-powering phenomenon (for example in HCMOS or TTL technology) and is supplied by a voltage VAV obtained upstream of a fuse 9 provided on this equipment, a direct current voltage V supplying the upstream end of this fuse. Like circuit 7, it includes the same number of individual logic circuits as the number of lines in the bus 6, and the number of lines for application thereto of the data D, each of these circuits being assigned to a line for applying the data D and a line on the bus 6. These individual logic circuits which are not separately shown can respectively be made up by three-state buffer circuits the inputs for enabling them or setting their output to the high impedance state being connected in common in order to form one control input EN of logic circuit 8.

Obviously, if transmission from each item of responding equipment to the interrogation equipment were to be performed in serial mode over a bus having one single line, the logic circuits 7 and 8 would each be reduced to one single individual circuit.

At the input EN for enabling logic circuit 8 or setting it to the high impedance state, a signal is applied that is obtained from the output of a logic circuit 10 adapted to detect coincidence between interrogation of this item of equipment by the interrogating equipment and absence of blowing of the fuse 9, enabling of logic circuit 8 requiring to be provided should coincidence be detected whereas the setting of its output to the high impedance state should be provided in the opposite case.

This logic circuit 10 is also implemented in a technology which may or may not be subject to the self-powering phenomenon, and is permanently powered by the voltage VAV obtained upstream of fuse 9. In the example considered, this logic circuit 10 is a NAND gate.

One of the inputs, A, of this gate is connected to the output from a circuit 11 for detecting interruption of the power supply involving the item of responding equipment 21 in other words for detecting blowing of the fuse 9 which is in fact constituted by simultaneous application to point A of firstly, the voltage VAP2 downstream of fuse 9 and, secondly, the voltage at one of the terminals of a resistor R2, the other terminal of which is at the reference voltage 0V.

A further input, B, of this gate receives the interrogation signal that relates to the item of responding equipment being considered, this here being signal CS1, via a circuit 12 for identifying blowing of fuse 4, provided on the interrogating equipment, at an absence of interrogation. This circuit 12 is in actually formed by the simultaneous application, to point B, of, firstly the interrogation signal, and secondly, the potential at one of the terminals of a resistor R1 the other terminal of which is at the reference potential 0V.

It may be advantageous to choose a logic circuit 8 that is implemented in a technology subject to the self-powering phenomenon, for example implemented in HCMOS technology, and a logic circuit 10 implemented in a technology that is not subject to the self-powering phenomenon, for example TTL technology.

In effect, logic circuits implemented in TTL technology have, as a counterpart to their low propagation time, the drawback of representing a cost overhead combined with heavy power consumption, this latter drawback being particularly sensitive for logic circuits such as circuit 8 performing a function of setting the output thereof to the high impedance state. Implementation of circuit 10 in TTL technology then makes it possible to limit the overall propagation time which would otherwise present the danger of becoming critical vis-a-vis the interrogating equipment while awaiting a response or answer. Moreover, the choice for logic circuit 10 of the same technology as that used for logic circuit 31 avoids the need of having to provide adaptation of logic levels between these two circuits which would be relatively complex in view of the presence of identification circuit 12.

In the case where logic circuit 8 is implemented in HCMOS technology and/or logic circuit 10 is implemented in TTL technology, adaptation of the "1" logic levels which it is then necessary to apply between these two circuits is performed using a resistor R4 connected to the point that is common to the output of logic circuit 10 and the enabling input of logic circuit 8, the other terminal of resistor R4 being at the potential VAV obtaining upstream of fuse 9.

Should the fuse 4 of the interrogating equipment blow, the logic circuits 31 to 3n and 7 of this equipment now no longer being powered, but being implemented in a technology that is not subject to the self-powering phenomenon, there is no danger of simultaneous interrogation of the responding items of equipment.

Moreover, as the responding equipment identifies a blowing of the fuse by an absence of interrogation, no response or answer is sent to the interrogating equipment.

Should a fuse 9 of an item of responding equipment blow, as logic circuits 8 and 10 of this equipment continue to be powered to ensure the output thereof is set to the high impedance state, there is no danger of an answer or response from this equipments, due to a self-powering phenomenon which could affect it, and a possible conflict of access to the common bus is thus avoided.

A resistor R3 can moreover be provided in the power supply input to logic circuit 8 in order to limit the supply current to this circuit which is not protected by a fuse.

As shown in FIG. 1, the protection device provided on the interrogating equipment can moreover include a circuit 13 for detecting an interruption of the power supply affecting an interrogated item of responding equipment, in other words for detecting blowing of fuse 9 of the interrogated responding equipment. This circuit 13 include, in parallel on each input terminal of logic circuit 7 connected to a line of bus 6, a resistor such as R5 supplied by the voltage VAP1 obtained downstream of fuse 4. This resistor R5 imposes a determined logic level on the corresponding input terminal of logic circuit 7 at the instant the responding equipment affected by blowing of a fuse responds, such blowing having the effect of setting its output to the high impedance state.

Figure 2:
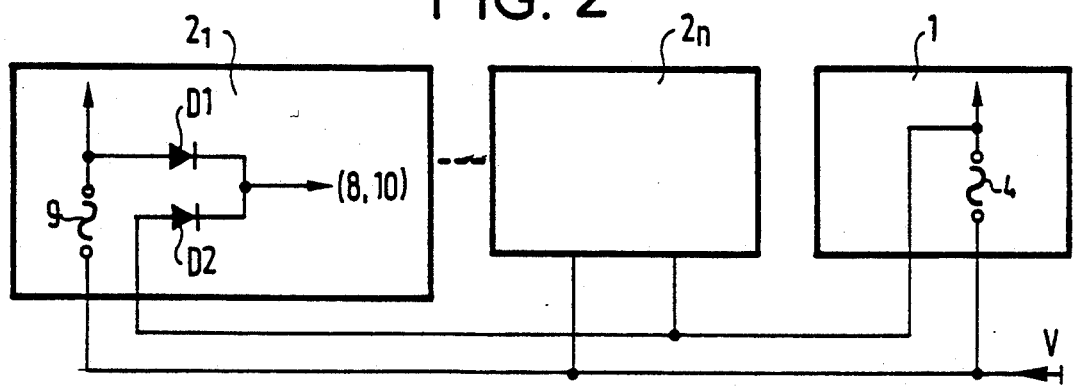
FIG. 2 shows one alternative embodiment of the circuit in FIG. 1.

As the permanent powering of the two logic circuits 8 and 10 presents a low but non-zero probability of causing degradation of these circuits, it can be advantageous to use the variant embodiment which will now be described with reference to FIG. 2. In this figure, power for circuits 8 and 10 is taken, on each one of the responding items of equipment, downstream of fuse 9 instead of upstream, and moreover provision is made for supplementary powering of these circuits by the voltage obtained downstream of fuse 4 of the interrogating equipment. Two diodes D1 and D2 provide the coupling between these two power supplies, these diodes having one of their terminals connected to the power supply input of circuits 8 and 10 and their other terminal connected respectively downstream of fuse 4 and fuse 9.

Another solution would consist in providing powering of logic circuits 8 and 10 by the voltage obtained downstream of a fuse assigned exclusively to these circuits.

We claim:

1. A protection device for a digital signal transmission system including at least first and second terminal equipment circuits with at least said second terminal equipment circuit having an output terminal, said device comprising disabling means included in at least said second terminal equipment circuit for disabling the output of said second terminal equipment circuit by setting said output terminal to a predetermined potential should a supply of power to at least some circuits within said second terminal equipment circuit be cut off, said second terminal equipment circuit including a logic circuit for providing said output, said logic circuit is implemented in a technology that is not subject to a self-powering phenomenon and is not powered when said power to said second terminal equipment circuit is cut off, and said logic circuit is an inverter.

2. A protection device for a digital signal transmission system including at least first and second terminal equipment circuits with at least said second terminal equipment circuit having an output terminal, said device comprising disabling means included in at least said second terminal equipment circuit for disabling the output of said second terminal equipment circuit by setting said output terminal to a predetermined potential should a supply of power to at least some circuits within said second terminal equipment circuit be cut off, said second terminal equipment circuit including a logic circuit for providing said output, said logic circuit is implemented in a technology that is not subject to a self-powering phenomenon and is not powered when said power to said second terminal equipment circuit is cut off, said transmission system further including said second terminal equipment circuit and "n" first terminal equipment circuits, with said second terminal equipment circuit comprising an interrogating equipment unit and said first terminal equipment circuits comprising responding equipment units, said responding equipment units being interrogated in turn on "n" separate transmission supports and responding over a common transmission support, and said device includes "n" logic circuits each associated with a respective one of said supports and implemented in a technology not subject to self-powering and supplied with power only in the absence of a cutting off of the power supply to said second terminal equipment circuit.

3. A protection device for a digital signal transmission system including at least first and second terminal equipment circuits with at least said first terminal equipment circuit having a logic circuit for providing an output, said device comprising disabling means included in at least said first terminal equipment circuit for disabling the output of said logic circuit should a supply of power to at least some circuits within said first terminal equipment circuit, other than said logic circuit, be cut off.

4. A protection device for a digital signal transmission system including at least first and second terminal equipment circuits with at least said second terminal equipment circuit having an output terminal, said device comprising disabling means included in at least said second terminal equipment circuit for disabling the output of said second terminal equipment circuit by setting said output terminal to a predetermined potential should a supply of power to at least some circuits within said second terminal equipment circuit be cut off, said disabling means further disabling the output of said first terminal equipment circuit when the power supply to said second terminal equipment circuit is cut off.

5. A protection device for a digital signal transmission system including at least first and second terminal equipment circuits with at least said first terminal equipment circuit having an output terminal, said device comprising disabling means included in at least said first terminal equipment circuit for disabling the output of said first terminal equipment circuit should the power supply to said second terminal equipment circuit be cut off.

6. A protection device for a digital signal transmission system including at least one interrogating equipment unit and "n" responding equipment units, said system transmitting digital signals between said interrogating equipment unit and said "n" responding equipment units, said responding equipment units being interrogated in turn on "n" separate transmission supports and responding over a common transmission support, wherein said device includes "n" logic circuits in said interrogating unit each associated with a respective one of said supports and implemented in a technology not subject to self-powering and supplied with power only in the absence of a cutting off of a power supply to said interrogating equipment unit, each logic circuit providing an output, said device comprising disabling means included in at least said interrogating equipment unit for disabling the output of said logic circuits should a supply of power to at least some circuits within said interrogating equipment unit be cut off.

7. A protection device for a digital signal transmission system including at least one interrogating equipment unit and "n" responding equipment units, said system transmitting digital signals between said interrogating equipment unit and said "n" responding equipment units, said responding equipment units being interrogated in turn on "n" separate transmission supports and responding over a common transmission support, wherein said device includes, in each responding equipment unit, a logic circuit with a control input for commanding either the setting of the output of said logic circuit to a high impedance state or enabling of said logic circuit, and a power supply detection circuit in each responding equipment unit for detecting cutting off of the power supply to at least portions of said responding equipment unit and for sending a signal to said control input for setting said output of said logic circuit to a high impedance state, and wherein said power supply detection circuit in each responding equipment unit is connected to the control input of its associated logic circuit via a coincidence detection circuit for detecting coincidence between an interrogation that relates to the associated responding equipment unit and an absence of cutting off of the power supply to said responding equipment unit, each said coincidence detection circuit commanding enabling of its associated logic circuit in the case where coincidence is detected, and commanding the setting of the output of the respective logic circuit to the high impedance state in the absence of coincidence.

8. A device according to claim 3, wherein said disabling means disables said output by setting said output to a high impedance state.

9. A device according to claim 8, wherein said logic circuit includes a control input other than a power supply terminal for commanding either the setting of the output of said logic circuit to a high impedance state or enabling of said logic circuit, wherein said device further includes a power supply detection circuit in said first terminal equipment circuit for detecting cutting off of the power supply to said first terminal equipment circuit and for sending a signal to said control input for setting said output of said logic circuit to the high impedance state.

10. A device according to claim 9, wherein said transmission system includes said second terminal equipment circuit and "n" first terminal equipment circuits, with said second terminal equipment circuit comprising an interrogating equipment unit and said first terminal equipment circuits comprising responding equipment units, said system transmitting digital signals between said interrogating equipment unit and said "n" responding equipment units, said responding equipment units being interrogated in turn on "n" separate transmission supports and responding over a common transmission support, wherein said device includes, in each responding equipment unit, said logic circuit with a control input and a power supply detection circuit detecting cutting off of the power supply, and wherein said power supply detection circuit in each responding equipment unit is connected to the control input of its associated logic circuit via a coincidence detection circuit for detecting coincidence between an interrogation that relates to the associated responding equipment unit and an absence of cutting off of the power supply to said responding equipment unit, each said coincidence detection circuit commanding enabling of its associated logic circuit in the case where coincidence is detected, and commanding the setting of the output of the respective logic circuit to the high impedance state in the absence of coincidence.

11. A device according to claim 8, wherein said logic circuit is implemented in a technology that is subject to a self-powering phenomenon.

12. A device according to claim 6, wherein said interrogating equipment unit includes a fuse for providing power to said logic circuits, and said logic circuits in said interrogating equipment unit are powered by the voltage obtained downstream of said fuse.

13. A device according to claim 6, wherein said interrogating equipment unit includes a further detection circuit for detecting cutting off of the power supply to the interrogating equipment unit.

14. A device according to claim 13, wherein said further detection circuit comprises an analog circuit including a resistor for coupling at least a portion of the common transmission support to a predetermined potential.

15. A device according to claim 7, wherein each of said interrogating and responding equipment units include a fuse for supplying power to at least portions of the respective equipment units, and wherein the fuse for each responding equipment unit further supplies power to the logic circuit and said coincidence detection circuit.

16. A device according to claim 7, wherein said responding equipment units include fuses for supplying power to at least portions of said responding equipment units, and wherein the logic circuit and coincidence detection circuit in each responding equipment unit are powered by voltage obtained from upstream of the fuse.

17. A device according to claim 16, wherein the power supply detection circuit comprises an analog circuit for simultaneously coupling one input of the coincidence detection circuit to a potential obtained downstream of the fuse and to a resistor which is connected to a reference potential.

18. A device according to claim 7, wherein said coincidence detection circuit receives interrogations relating to its respective responding equipment unit via an identification circuit which identifies the cutting off of power supply at the interrogating equipment unit by interrupting interrogation by said interrogating equipment unit.

19. A device according to claim 18, wherein said identification circuit comprises an analog circuit for simultaneously coupling one input of said coincidence detection circuit to an output from said identification circuit and to a resistor which is connected to a reference potential.

20. A device according to claim 7, wherein each of said interrogating and responding equipment units includes a fuse for providing power, and wherein the logic circuit and coincidence detection circuit in a responding equipment unit are simultaneously powered by a voltage obtained downstream of the fuse provided in said responding equipment unit and by a voltage obtained downstream of the fuse provided in said interrogating equipment unit.

21. A device according to claim 7, wherein said coincidence detection circuit comprises a NAND-type logic gate.

* * * * *